United States Patent
Miller

(10) Patent No.: US 7,877,648 B2
(45) Date of Patent: Jan. 25, 2011

(54) FAULT TOLERANT DATA PROCESSING

(75) Inventor: Peter John Miller, Bedfordshire (GB)

(73) Assignee: Ricardo UK Limited, West Sussex (GB)

( * ) Notice: Subject to any disclaimer, the term of this patent is extended or adjusted under 35 U.S.C. 154(b) by 887 days.

(21) Appl. No.: 11/597,143

(22) PCT Filed: May 18, 2005

(86) PCT No.: PCT/GB2005/001930

§ 371 (c)(1),
(2), (4) Date: Jun. 18, 2007

(87) PCT Pub. No.: WO2005/114419

PCT Pub. Date: Dec. 1, 2005

(65) Prior Publication Data

US 2007/0294602 A1 Dec. 20, 2007

(30) Foreign Application Priority Data

May 18, 2004 (GB) .............................. 0411054.0

(51) Int. Cl.
*G06F 11/00* (2006.01)
(52) U.S. Cl. ..................................... 714/715; 714/55
(58) Field of Classification Search ............ 714/55, 714/715
See application file for complete search history.

(56) References Cited

U.S. PATENT DOCUMENTS

| | | | |
|---|---|---|---|
| 4,733,353 A * | 3/1988 | Jaswa ....................... 713/375 |
| 4,972,415 A * | 11/1990 | Walter et al. ............... 714/797 |
| 5,388,242 A * | 2/1995 | Jewett ....................... 711/113 |
| 5,710,776 A * | 1/1998 | Tomlinson et al. ........... 714/704 |
| 6,240,526 B1 | 5/2001 | Petivan et al. |
| 7,515,589 B2 * | 4/2009 | Bacher et al. ............... 370/392 |
| 2002/0143998 A1 * | 10/2002 | Rajagopal et al. ........... 709/248 |
| 2003/0005371 A1 * | 1/2003 | Miller ....................... 714/715 |
| 2007/0294602 A1 * | 12/2007 | Miller ....................... 714/55 |

FOREIGN PATENT DOCUMENTS

| | | |
|---|---|---|
| EP | 0 247 026 | 11/1987 |
| EP | 0 935 198 | 8/1999 |
| EP | 1 271 854 | 1/2003 |
| JP | 2002-108638 | 4/2002 |

OTHER PUBLICATIONS

European Search Report for GB0411054.0, Search Date Sep. 24, 2004 (1 page).

(Continued)

*Primary Examiner*—Robert Beausolieo
*Assistant Examiner*—Jeison C Arcos
(74) *Attorney, Agent, or Firm*—Osha Liang LLP

(57) ABSTRACT

A method of identifying a valid version of a data value and voting on separate instances of the data value is described. A processor receives an instance of the data value generated by one processor and a transmitted version of that generated instance transmitted by another processor and compares the received values to validate them. The processor further determines an agreed version of the data value from a comparison of the validated instances. As a result a simple and robust voting system is provided.

20 Claims, 8 Drawing Sheets

OTHER PUBLICATIONS

Patent Abstract for JP2002108638 dated Apr. 12, 2002 (3 pages).
"Loop Transformations for Fault Detection in Regular Loops on Massively Parallel Systems" Author(s): Gong Melhem as published in IEEE Transactions on Parallel and Distributed Systems vol. 7, No. 12, Dec. 1996 (16 pages).
International Search Report for PCT/GB2005/001930 mailed Feb. 16, 2006 (1 page).
http://www.eecis.udel.edu/~mills/exec.html (11 pages), 2006.
http://www.faqs.org/rfcs/rfc1305.html (108 pages), Mar. 1992.
http://www.vmars.tuwien.ac.at/php/pserver/extern/docdetail.php?DID=294&viewmode+paper (1 page), Aug. 2002 see, attached doc.

* cited by examiner

FAULT TOLERANT DATA PROCESSING

The invention relates to fault tolerant data processing.

Fault tolerant data processing is required in applications where faults can give rise to a critical/fatal condition for example in vehicular applications such as brake-by-wire or steer-by-wire where, if a brake or steering sensor fails then in the absence of fault tolerance, the results could be catastrophic.

A known approach to providing fault tolerance is to use either exact or in inexact voting. Voting can be used in applications where fault tolerance is required, for example where a value such as a sensor input is calculated independently at multiple processors to obtain redundancy. In such an event, the independent values can be compared to establish whether there is correspondence between them and, where there are three or more processors, as long as a majority of the values correspond, the majority value is adopted as the correct value, forming a majority voting scheme.

Referring for example to FIG. 1 first and second processors 10,12 for example engine control units (ECUs) A and B respectively are joined by a link 14. Both processors or nodes receive a common sensor input and the results for the two nodes are compared for cross-checking. If the results are identical then the results can be used. However if the results are significantly different an error has occurred.

Referring to FIG. 2 a system using three processors comprises an ECU A reference numeral 20, an ECU B, reference numeral 22 and an ECU C, reference numeral 24. Processor 20 is joined to processor 22 and 24 by links 26 and 28 respectively and processor 22 is joined to processor 24 by link 30.

Because there are three processors receiving a common data input, it is possible to vote on the results. If a majority is reached, that is, two out of the three processors agree on the result, then this can be identified as the correct result. This could also allow the fault to be potentially identified.

One known approach for implementing voting is shown in FIG. 3 which comprises processors 40, 42, 44 joined by a link generally shown at 46 comprising a redundant high speed network, for example comprising multiple links between each pair of processors. The voting algorithm is distributed amongst the three processors so as to avoid a single point of failure which could otherwise be provided by a single voting module.

In the case of inexact voting, rather than a majority of processors returning the same value which is then accepted as the output, each may return a different data value which is nonetheless similar enough to a majority of other values to allow derivation of an agreed value. For example where a majority of values are similar within a predetermined permissible error then an output can be obtained as a function of the data values comprising the majority, for example a mean. For example where respective processors return data values 0, 1, 200 then the values 0 and 1 may be within the permissible error and hence form a majority and the output will be the mean of these two values i.e. 0.5. On the other hand if the returned values are 0, 100, 200 then there may be no majority within a permissible error bound.

Problems arise with the known approaches, however. One such problem is where one of the processors is unreliable such that the results that it returns may differ dependent on which node it communicates with. This problem is sometimes termed the "Byzantine General Problem" and is described at http://www.eecis.udel.edu/~mills/exec.html. In some instances the problem has been solved but not in the case of inexact voting for a small number of nodes such as three nodes.

In addition synchronisation problems arise with voting systems of the type described above. Synchronisation is very important in applications where multiple processors have to vote on an instantaneous sensed value from a continuously varying parameter as, if different processors vote on the sensed value taken at different times, errors can clearly arise. Various known systems are provided for synchronising multiple processors for example of the type described at http://www.faqs.org/rfcs/rfc1305.html which relies on a master clock and requires a large number of nodes for synchronisation. Such an approach is not suitable for a fully distributed system with no specific master, nor for a system with a low number of processors. Although distributed approaches are known, for example as described in http://www.vmars.tuwien.ac.at/php/pserver/extern/docdetail.php?DID=294&viewmode=paper these require a hierarchy and do not achieve the resolutions required for time critical applications. Furthermore known systems suffer from problems of compensating for the communication time delay between nodes and also can be affected by the time taken to process the synchronisation information itself.

The invention is set out in the claims. Because a processor receiving a version of the data values from other processors in a network compares both the version generated by a processor and the corresponding version transmitted by another processor in a round of communications, this allows identification of a valid data value from each processor even in the case where the Byzantine General Problem arises and can be used to obtain an agreed version of data between processors, for example using inexact voting. Furthermore the use of a voting process to determine a synchronised time value across a network means that synchronisation can be achieved even for a small number of nodes in a fully distributed system. Yet further where the synchronised time value is based on a calculation of an offset between processors this allows compensation for time delay for communication between processors and means that the time taken for the synchronisation calculation steps themselves does not affect the synchronisation process.

Embodiments of the invention will now be described, by way of example, with reference to the drawings, of which:

Figure 4A:
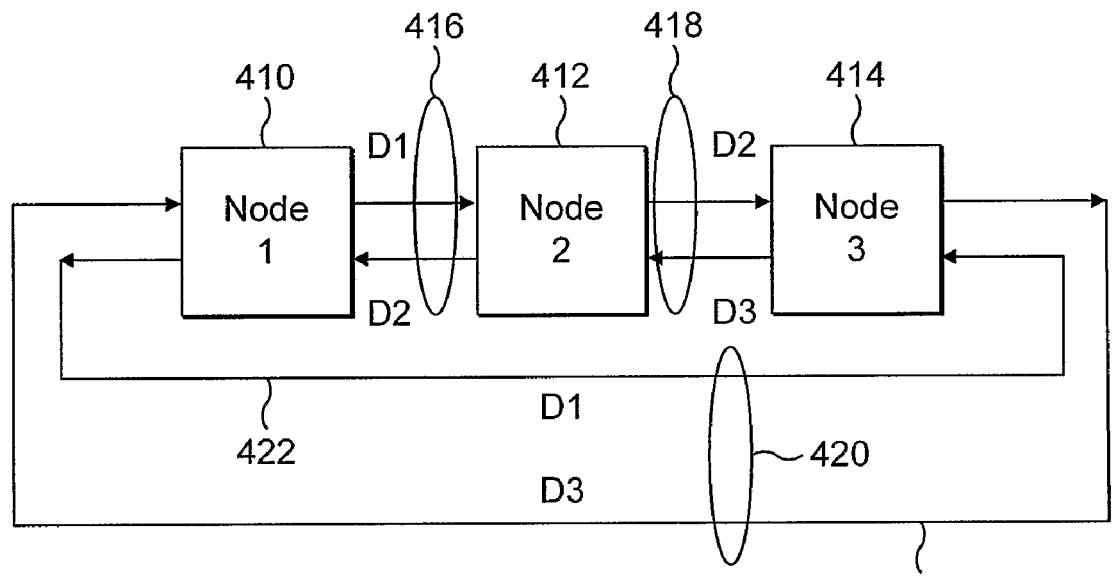
FIG. 4a is a block diagram showing a three processor fault tolerant system according to the present invention in a first round of communication.
Figure 4B:
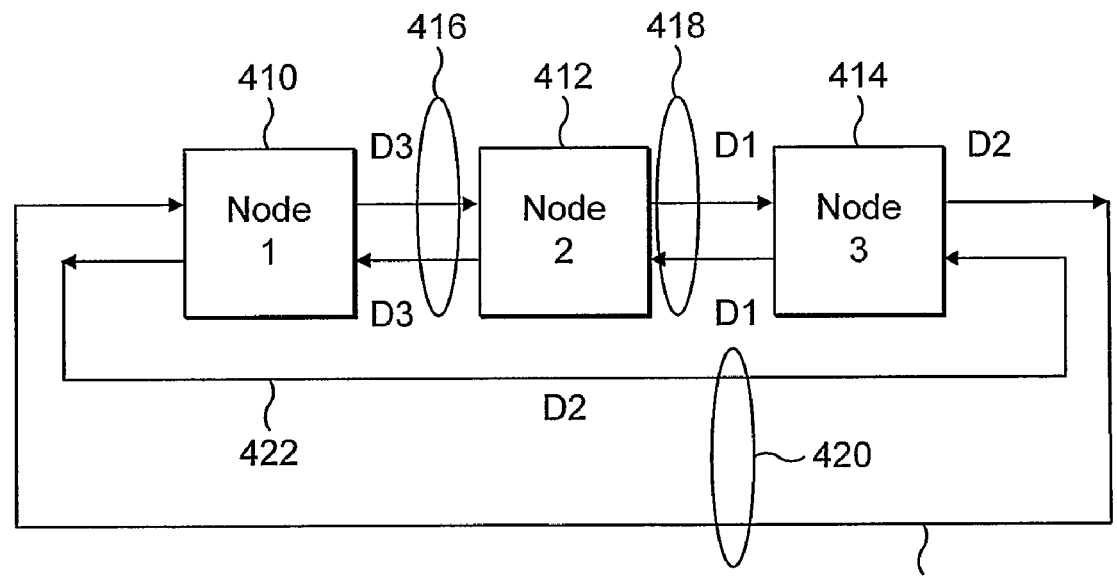
FIG. 4b is a block diagram showing the three node processor fault tolerant system according to the present invention in a second round of communication.

In overview, referring to FIGS. 4*a* and 4*b* three nodes or processors 410, 412, 414 joined in a ring by links 416 (between processors 410 and 412), 418 (between processors 412 and 414) and 420 (between processors 414 and 410). The links allow communication in both directions between the processors effectively defining a clockwise path 424 and an anti-clockwise path 422. In a first round of communication as shown in FIG. 4*a*, processor 410 sends a data value d1 to each of its adjacent processors 412 and 414 and the other processors 412 and 414 similarly send data D2 and D3 respectively to each adjacent processor. Accordingly each data value D1, D2, D3 proceeds one step along both the clockwise and anti-clockwise paths 422, 424. In the second round of communication shown in FIG. 4*b* each processor sends the received data from the previous round to each adjacent node in the same direction as it was received. Accordingly processor 410 sends data D2 to processor 414 and data D3 to processor 412 and so forth, along the respective paths.

As a result after two rounds of communication, each processor can compare a data value from another processor received from each direction (clockwise and anti-clockwise), one comprising a version directly generated by the other processor and one comprising a transmitted version thereof by the intermediate processor. So, for example, processor 410 can compare the data value D3 received directly from processor 414 that generated it, in the first round of communication and also the version thereof transmitted by processor 412 in the second round of communication. As discussed in more detail below this allows detection of a Byzantine type fault and, if not, validation of the data. In an optimisation this step can be used as a precursor to an exact or inexact voting process. The invention further extends to synchronisation techniques based on similar voting principles but also enhancing the voting process.

Figure 5:
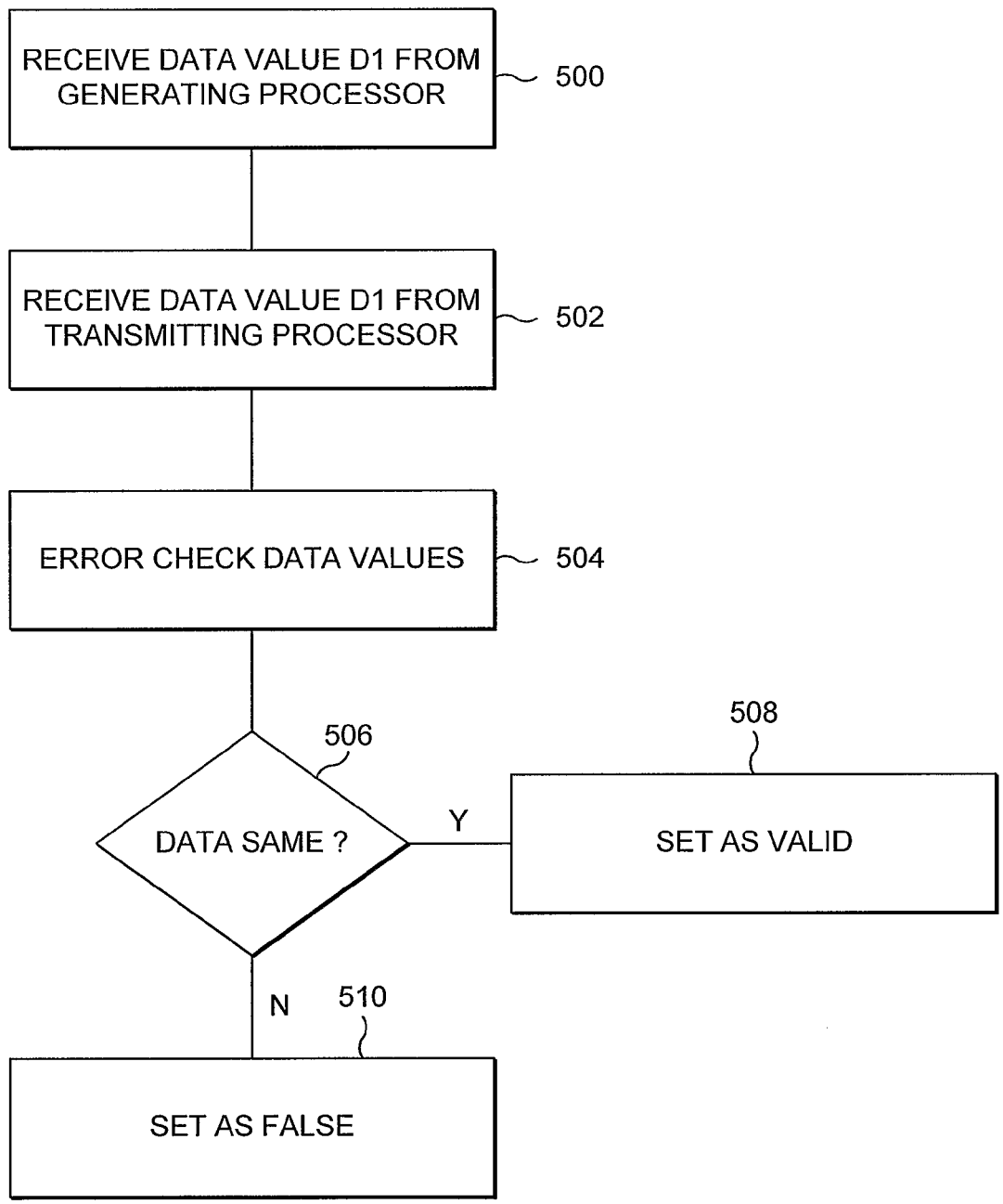
FIG. 5 is a flow diagram showing the steps in a data validation process according to the present invention.

The invention can be further understood with respect to FIG. 5 which represents a method of identifying a valid version of a data value which is performed simultaneously at each node and for each data value to be validated. In block 500 a processor receives a data value D1 from the corresponding processor that generated it and forwarded it in the clockwise direction (termed here c1). In block 502 the node receives the data value D1 in the second round of communication in the anti-clockwise direction from a transmitting node (termed here a1). In block 504 the processor carries out any appropriate basic data checks such as a cyclic redundancy check, parity bit check or any other appropriate error detection routine as will be well known to the skilled person. For example the processor can carry out a check in the manner described in more detail in a co-pending application filed on the same day as the present application in the name of Ricardo UK Limited entitled "Data Processing". Assuming that the data checking is successful values c1$v$ and a1$v$ are returned. In block 506 the checked values are compared and if they are the same then in block 508 they are returned valid and c1$v$ and a1$v$ are set to "valid". If the values are not the same then in block 510 the values are returned false and c1$v$ and a1$v$ are set to "false". In an optimisation, in order to compensate for any processing errors within the processor (as opposed to data transmission errors) the values can be considered the same if they differ by only a small amount within a predetermined tolerance.

As a result Byzantine faults of the type where a node sends different versions of the same data value to different nodes are identified because both versions are compared at each processor. The system will work for exact or inexact voting approaches as discussed in more detail below and is fast, robust and operable for a small number of nodes in a fully distributed system.

Figure 6:
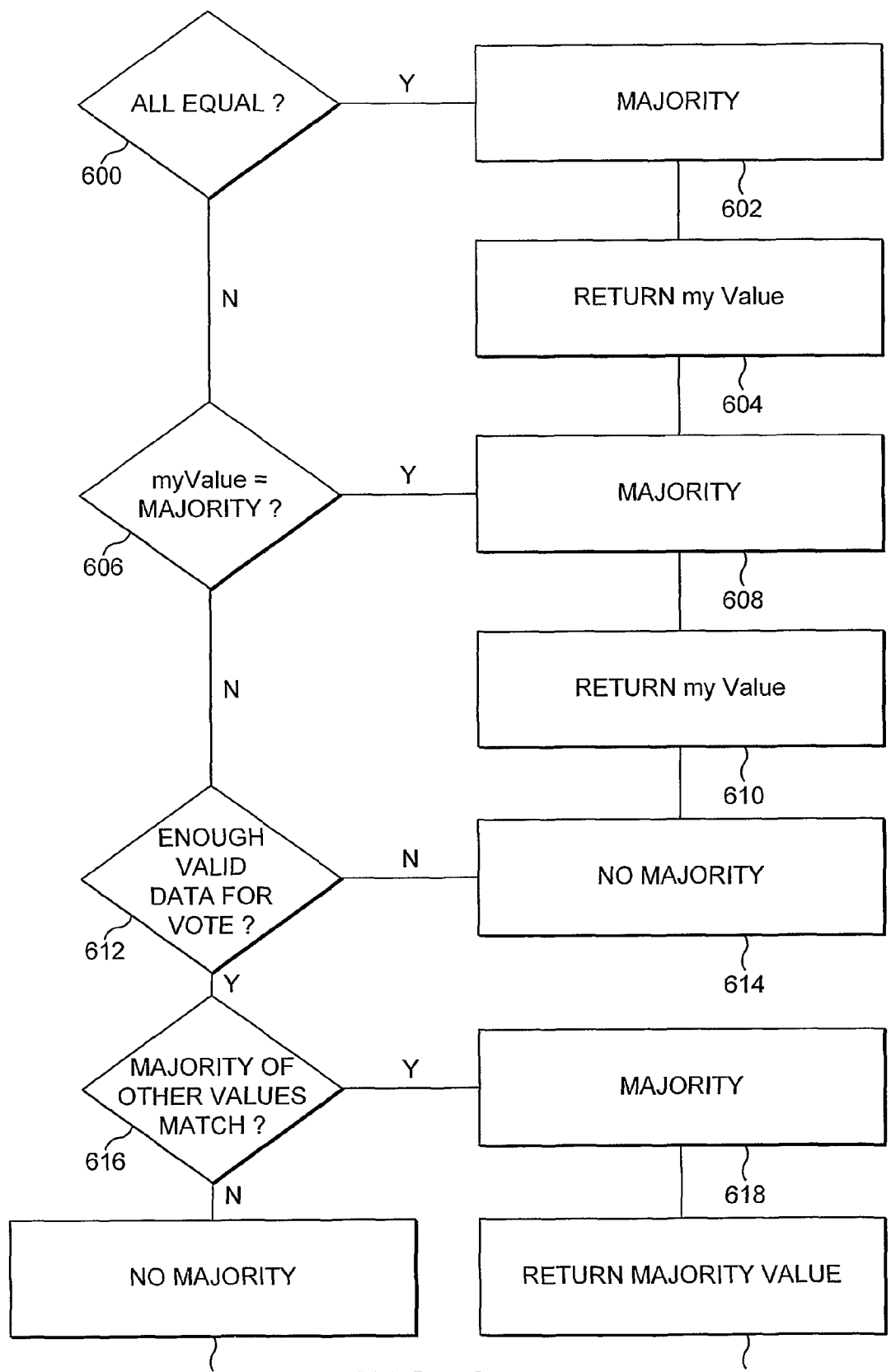
FIG. 6 is a flow diagram showing the steps in a voting process according to the present invention.

The values returned according to the method described with reference to FIG. 5 can then be returned and used to vote on an agreed version of the data value between all nodes, the specific value from each node having been validated. This can be further understood with reference to the algorithm represented by FIG. 6 which again is performed at each processor simultaneously according to a synchronisation technique discussed in more detail below. Each processor carries out a comparison of the values received from each other processor in both directions (i.e. both the version generated by each other processor and the version transmitted by another processor) as well as the values it has generated itself, termed here "my value" which is assumed to be error free (as it has not been transmitted) and self-matching (as the version sent in either direction would have been the same).

In block 600 the processor establishes whether all of the values are valid and equal. In other words if c1$v$ and a1$v$ are valid, c1 is equal to a1 and either of c1 or a1 are equal to the value at the processor (my value) then there is a clear majority as identified in block 602 there is no need, in the three processor example, to consider c2 and a2 and the value at the processor (my value) is returned in block 604. As a result, this initial step allows the process to be completed in the vast majority of cases where all of the data values can be expected to be exactly the same (that is, no fault). Accordingly the computational burden is reduced in many cases.

If not all values are valid or not all values are equal then in block 606 the processor checks whether its value (my value) represents a majority, that is, it matches more than half of the valid values a1$v$, c1$v$, a2$v$, c2$v$ and so forth. If so, in block 608 the value at the processor is identified as the majority value and that value (my value) is returned in block 610. If the value at the processor is not in the majority then in block 612 the processor establishes whether there is enough valid data received from the other processors to allow a vote to take place given that the values at the processor itself, having been established as not in the majority, must be outvoted by a majority returned from the remaining processors. If this is not possible then in block 614 the processor returns no majority and the process ends. However if there is enough valid data to allow a vote then in block 616 the processor establishes whether a majority value exists and if so then in block 618 the majority is identified and in block 620 the majority value is returned. If there is no majority available in block 616 then in block 622 a "no majority" result is returned and the process ends.

Figure 7:
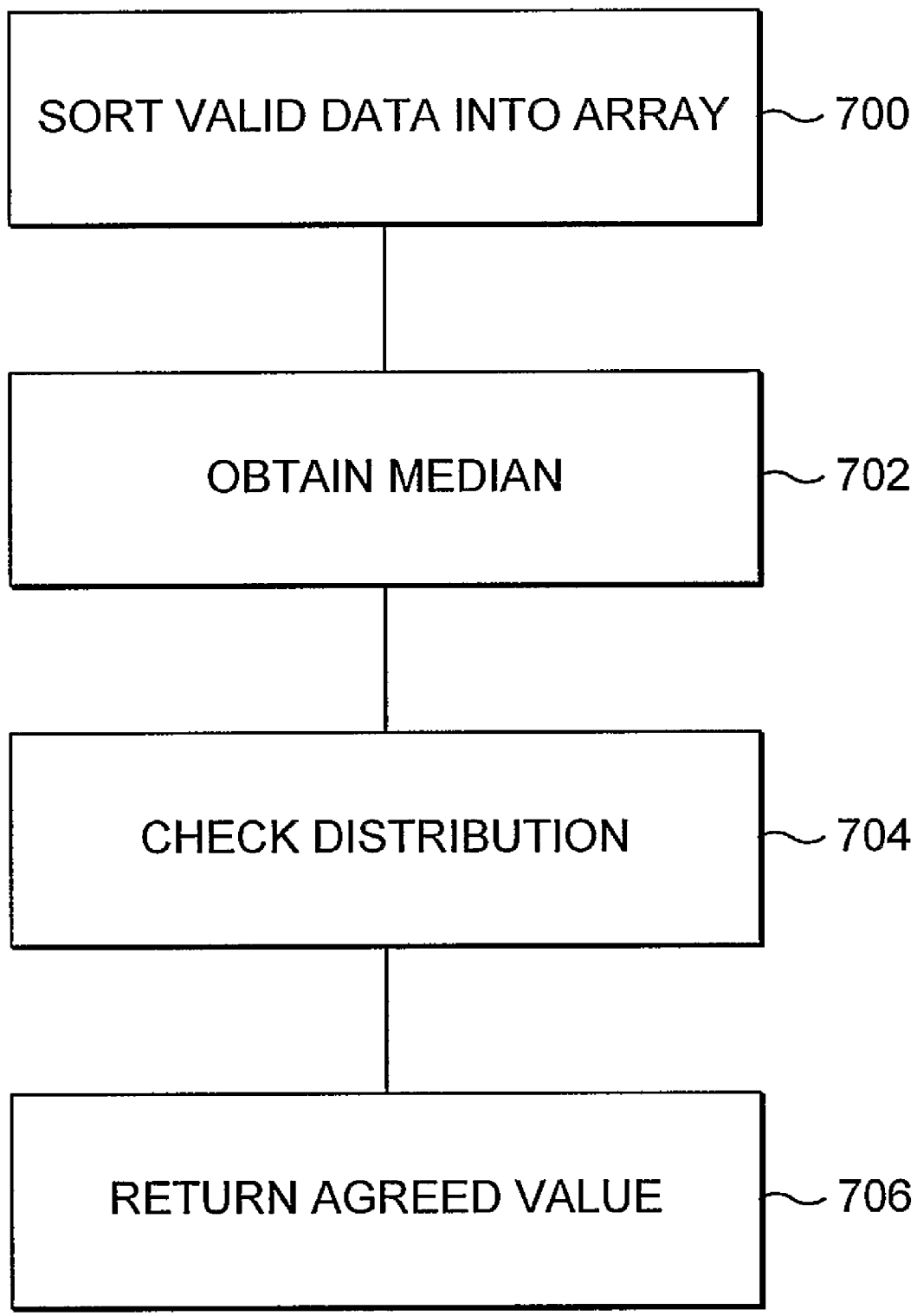
FIG. 7 is a flow diagram showing the steps in an inexact voting process according to the present invention.

It will be appreciated that the approach can be extended to an inexact voting protocol as described with reference to FIG. 7. Once again the algorithm is performed at each processor simultaneously, the values generated and transmitted having been checked and validated to obtain c1$v$ and a1$v$ as discussed above with reference to FIG. 5. In block 700 the valid data is sorted into an array for example in ascending value and in block 702 the statistical median of the data values is obtained. The median is preferred as it selects either the middle value in a range of values or the mean of the two middle values in the case of an even number of values. Because of this approach, "outliers", that is, values at either end of the range which are significantly distanced from the remainder of the values, do not affect the eventual value returned (which would not be the case if the mean were taken in which case they would have an unrepresentative biasing effect).

In an optimisation, in block 704 the processor checks that the data lies within an acceptable range as determined by a pre-set tolerance. For example in a first step the lowest and highest values in the array are checked to establish whether they are within the required tolerance and if so the full range will of course also be within the desired range. If not then the two middle values are checked to see whether they are within the desired tolerance and if so the value is accepted. If not then the value is not accepted.

Assuming that the values are within the predetermined tolerance range then in block 706 the median data value is returned as the agreed value according to the inexact role.

It will be appreciated that the method described above can be implemented in any appropriate manner and is of particular relevance to fault tolerant applications. In fact it is found that the approach described can be implemented within existing micro processors within a system rather than requiring external hardware or additional processors to support voting and time synchronisation (as discussed in more detail below).

Figure 8:
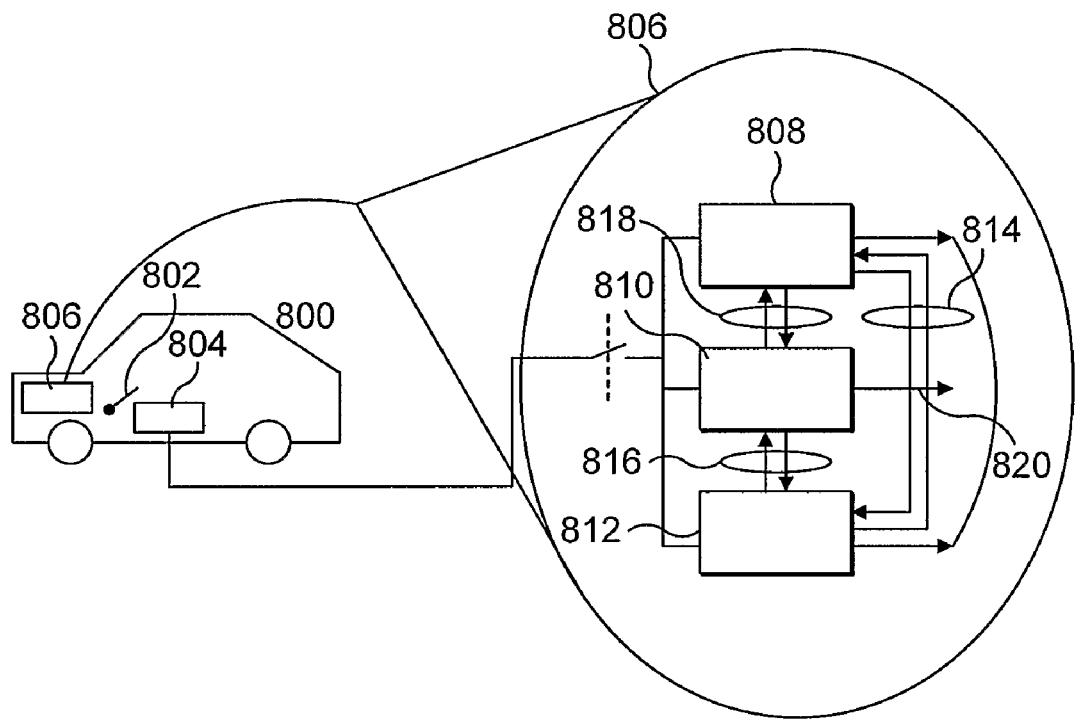
FIG. 8 is a block diagram showing the components implementing a method according to the present invention.

One implementation for the purposes of example is described below in relation to vehicular fault tolerant applications. Such applications could comprise for example brake-by-wire and steer-by-wire. Referring to FIG. 8, a brake-by-wire system implementing the present invention is shown. An automobile 800 includes a brake pedal of conventional type 802 but which includes a multiple sensor array 804 rather than a conventional mechanical linkage to detect a brake pedal control input from the driver. For example the sensors can comprise pressure sensors positioned beneath the pedal such that when the pedal is depressed the pedal sensors detect a pressure value. Multiple sensors are provided to allow redundancy and fault tolerance and in the arrangement discussed herein three equivalent sensors are provided to allow appropriate input to the triplex processor system. It will be appreciated that, ideally, all three sensors should provide an equivalent output as they should all record the same brake pedal control input. However the system must be able to deal with variations between the outputs of the three sensors and any sensor failure, and also ensure that sensor inputs are extracted simultaneously.

Figure 1:
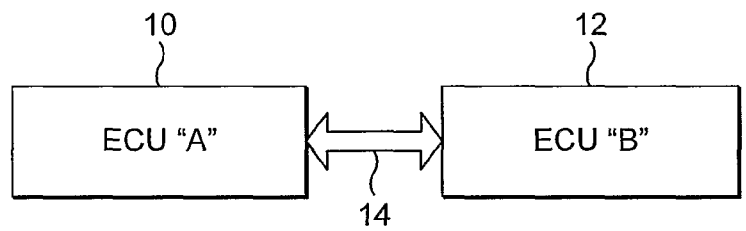
FIG. 1 is a block diagram showing a known two processor fault tolerant system.
Figure 2:
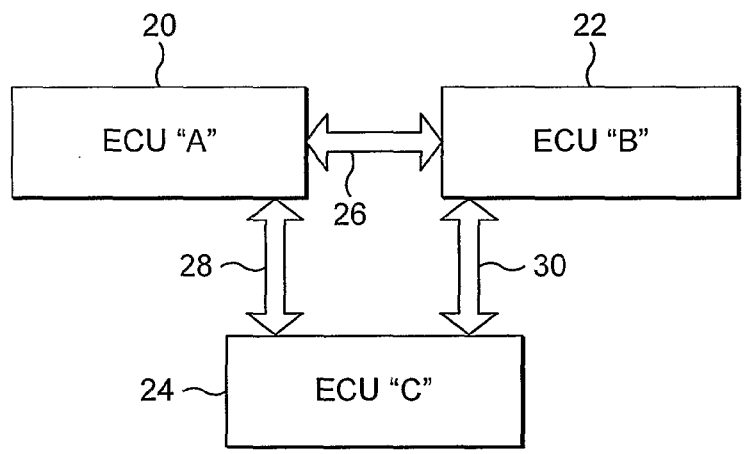
FIG. 2 is a block diagram showing a known three processor fault tolerant system.
Figure 3:
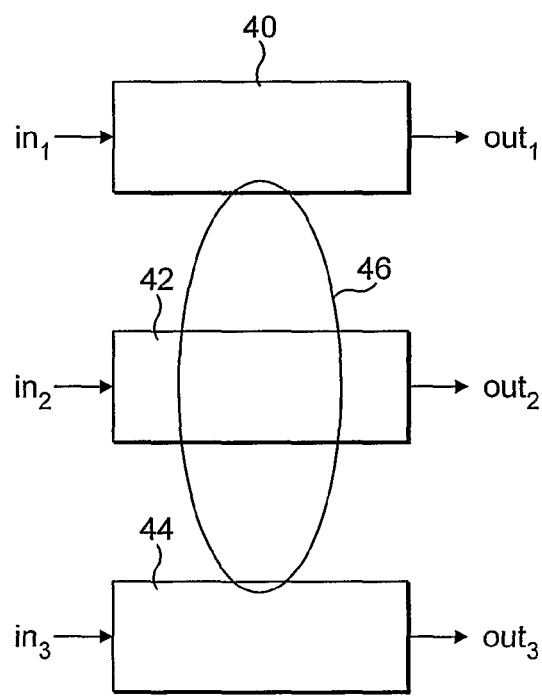
FIG. 3 is a block diagram showing a known three processor fault tolerant system using distributed voting.

The sensor outputs are received as system inputs to a processor system or distributed processor system 806 which may be provided in an engine or brake control unit or in separate processor modules. In the embodiment shown, three processors 808, 810, 812 are provided comprising, respectively, an external monitoring controller, a chassis systems controller and an engine management system. As a result the functionality to allow voting and fault tolerance in relation to the brake-by-wire approach is built into the existing processors carried in the vehicle. The processors 808, 810, 812 communicate in a ring mode as described above with regards, for example, to FIGS. 2 to 4 via links 814, 816, 818. It will be appreciated that the individual processors can be of any appropriate type as will be well known to the skilled person as can the links. For example the links can be full duplex 100 Mbps ethernet links. Each of the processors has an output 820 from which the result of the voting discussed above together with any other outputs from the processor generally are received.

Figure 9:
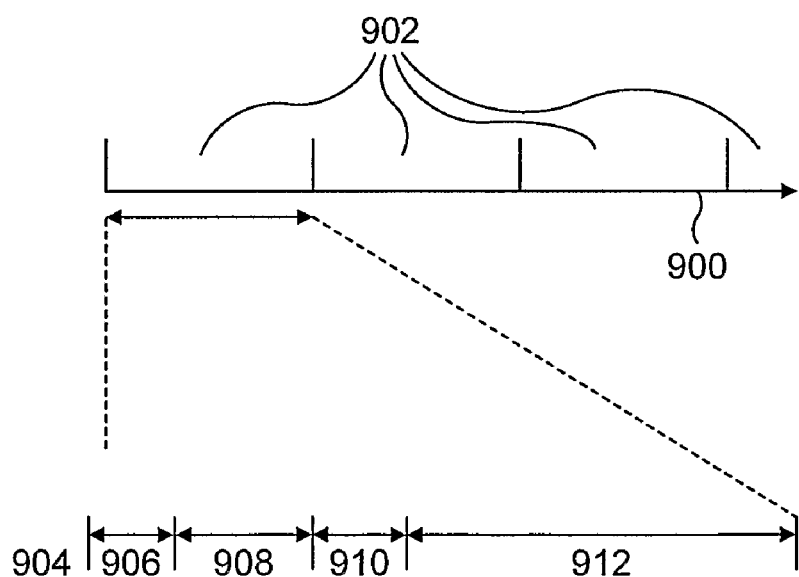
FIG. 9 is a timeline showing the various intervals in a synchronisation process according to the present invention.

In order to obtain time synchronisation of the various data values from each processor and hence a representative fault tolerant system in which voting is carried out at the same time in all nodes, time synchronisation can be achieved using the same voting algorithm as discussed above. The basic time line can be understood with reference to FIG. 9 in which a time line 900 is divided into 1 ms task intervals 902 although of course any appropriate interval length can be adopted. In the case of sensors monitoring continuously variable parameters for example braking signals from the brake pedal, the sensor outputs need to be sampled frequently and consensus reached not only on the sensor value but on the time instant at which the sensor output was sampled. Accordingly the system is configured to sample the output at each 1 ms interval 902 and synchronise the processor times as part of each sampling interval. The preferred protocol, therefore, is to commence voting and send time synchronisation signals at the beginning of each interval at an instant 904. Because the processors will not be perfectly synchronised then this instant will be spread across an interval 906 representing the time synchronisation accuracy across the network. A further delay interval 908 arises because of the time required for data to communicate across the network. At the end of these two intervals, 906, 908, all processors will have sufficient information to implement the software voting algorithm to determine an agreed synchronisation time between the processors. This algorithm takes a finite interval 910. The remainder 912 of the task interval 902 comprises the time remaining for the actual processing to take place on the sensor output.

Figure 10:
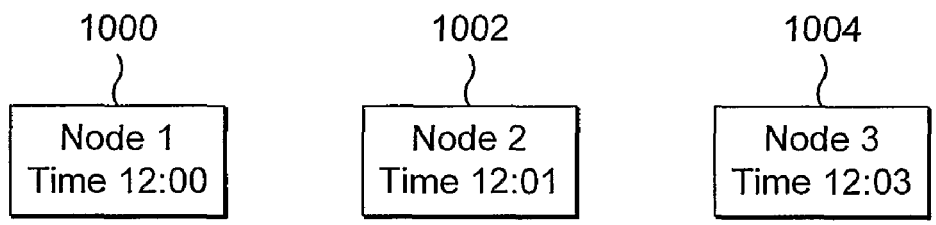
FIG. 10 is a block diagram showing synchronisation between three processors according to the present invention.
Figure 11:
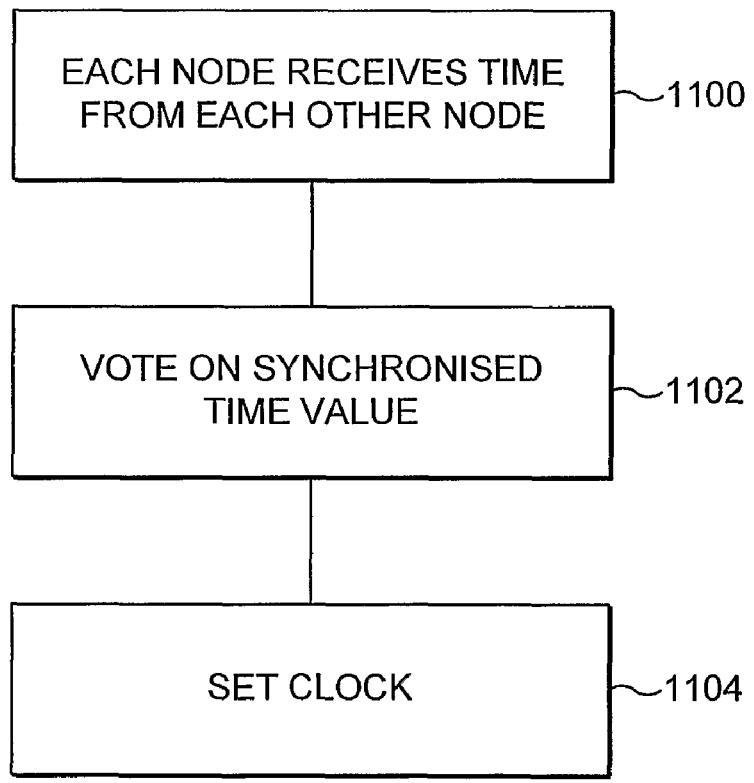
FIG. 11 is a flow diagram showing the steps in synchronising multiple processors according to the present invention.

In overview the synchronisation method can be understood with reference to FIGS. 10 and 11. Referring first to FIG. 10, three processors 1000, 1002 and 1004 communicating via an appropriate link (not shown) are out of synchronisation relative to one another such that when the time is 12:00 at the first processor 1000, the second processor 1002 is offset by one minute and so sees the time at the same instant as 12:01 and the third processor 1004 is offset by three minutes relative to the first processor 1000 and at the same instant sees the time as 12:03. Referring to FIG. 11, at step 1100 each node receives the time from the other nodes. In block 1102 the nodes vote on the correct time using, for example, the inexact voting method described above with reference to FIG. 7. As a result all nodes settle on the median value 12:01, the median time, as the synchronised time value. In block 1104 each processor adjusts its clock accordingly. It will be seen that, as long as this is done effectively at the same instant across all processors, they will be thus synchronised to the correct time. In the preferred approach, each processor not only resets its time to the agreed synchronisation time value but also adjusts its rate taking into account its offset from the other clocks in order to converge on a common rate, effectively forming a feedback loop. Any appropriate approach may be adopted for achieving this as will be well known to the skilled reader. Accordingly the processors are synchronised until the next synchronisation instant arrived at which point further corrections will take place.

Figure 12:
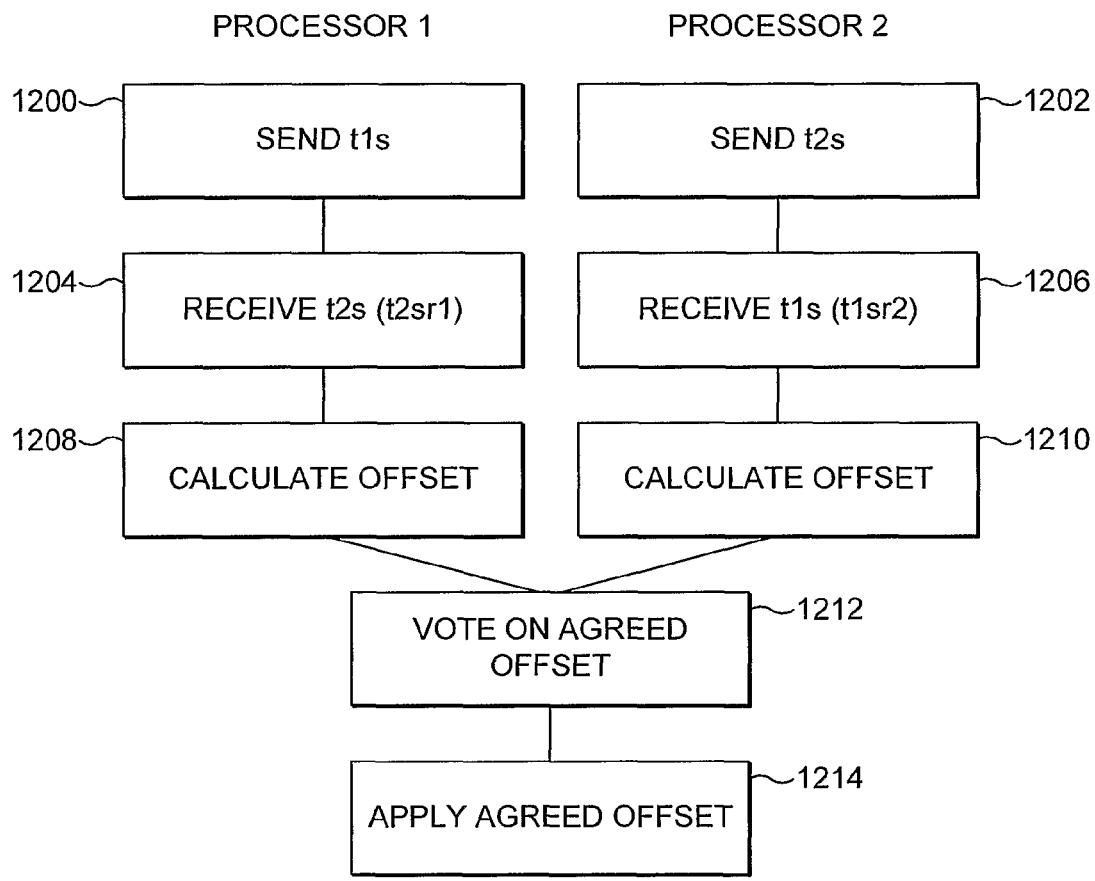
FIG. 12 is a flow diagram showing the steps involved in synchronising multiple processors according to an optimisation of the present invention.

It will be seen that two factors in particular must be accounted for in the synchronisation process, namely the synchronisation offset between any two nodes ($t_o$) and the network transmission time delay ($t_d$). A preferred approach for compensating for these and also the time for processing the time synchronisation algorithm can be better understood with reference to FIG. 12 where the approach is described with reference to a system comprising two processors for the purposes of clarity and is shown running in parallel at each processor as appropriate. In blocks 1200 and 1202 the respective first and second processors (processor 1, processor 2) send a synchronisation signal $t_1s$, $t_2s$. Because of the offset $t_o$ the relationship between the signals is given by equation (1) below:

$$t_2 s - t_0 = t_1 s \quad (1)$$

In blocks 1204 and 1206 the respective nodes receive the synchronisation signals from the other node at respective times $t_2 sr_1$, $t_2 sr_2$, and taking into account the transmission delay $t_d$ (considered to be the same in both directions) this provides:

$$t_1 s + t_d = t_1 sr_2 - t_0 \quad (2)$$

and $$t_2 s - t_0 + t_d = t_2 sr_1 \quad (3)$$

In blocks 1208, 1210 each processor calculates the offset $t_0$. In particular this can be obtained by solving equations (2) and (3) to obtain:

$$t_0 = ((t_1 sr_2 - t_1 s) - (t_2 sr_1 - t_2 s))/2 \quad (4)$$

In block 1212 each node votes on an agreed offset value from the calculated offsets at each node and in particular a median value is obtained across all nodes. It will be noted that each node as part of the voting process will also take into account its time offset for its own time value i.e. zero offset. In block 1214 each node applies the agreed offset by adding it to its current time value at the synchronisation instant (which, from the point of view of each node, will be exactly the same time of course) such that the processors hence converge on an agreed synchronisation time. This adjustment method, taking into account the calculated offset, means that the time to do the calculations themselves—interval 910 in FIG. 9 does not affect the result hence eliminating the calculation time as a factor in obtaining accurate synchronisation.

It will further be seen that equations (2) and (3) can be solved to obtain a value for the network delay $t_d$ between nodes to provide:

$$t_d = (t_1 sr_2 - t_1 s) - t_0 \quad (5)$$

If desired $t_d$ can be calculated as well in order to establish that the value falls within a predetermined range of values—otherwise an error may be indicated. The system may be arranged such that a slight time offset is retained between processors such that they are not perfectly synchronised. This can give rise to significant advantages in fault tolerant applications where errors can arise may be propagated in the case that all processors are perfectly synchronised.

As a result of this synchronisation approach stable synchronisation to a resolution of 10 μs can be obtained over a shared intranet despite the potentially long network transmission delays involved. The synchronisation technique can work with as few as two processors unlike known systems which often require large numbers of processors to obtain the desired level of synchronisation.

It will be recognised that the synchronisation technique can be implemented, for example, in the architecture described with reference to FIG. 8 above.

Figure 13:
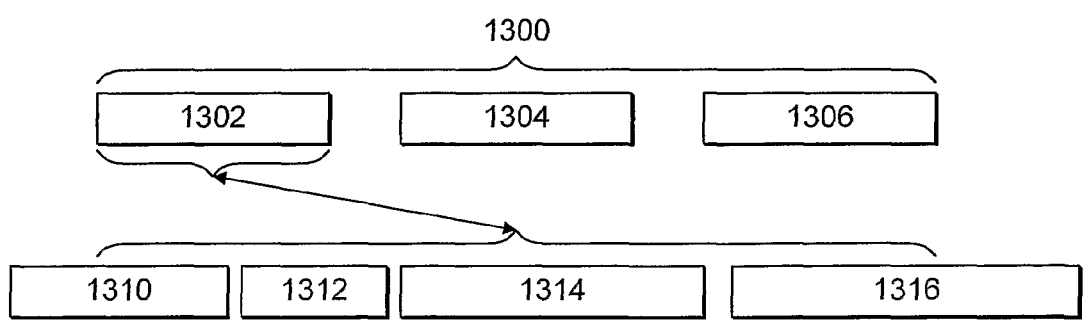
FIG. 13 shows a data structure for implementing a method according to the present invention.

Although any appropriate data transmission protocol can be adopted, a data packet structure of the type shown in FIG. 13 provides various advantages. The data structure comprises, for example, an ethernet frame 1300 with a capacity of 1500 bytes. The frame 1300 comprises a header 1302, a data segment 1304 and a check word 1306 each of which can be of any appropriate format and the check word determined according to any error checking protocol as will be well known to the skilled reader. The header 1302 is further subdivided into a start marker 1310 of the type discussed above with reference to FIG. 12, a processor or node identification field identifying in the processor which issued the message, time synchronisation data 1314 and a time synchronisation check word 1316. As a result in the timeline shown in FIG. 9 the initial step of time synchronisation can be carried out by processing the header initially such that software supporting the synchronisation algorithms is configured accordingly and restricted to processing of the header data.

Because each processor runs identical code both for time synchronisation and voting the data segment 1304 does not require special information in its contents as each node will recognise the required format having transmitted similar data itself. As a result for exact voting it is only necessary to vote based on a comparison of the check word 1306 as, if these agree, it is assumed that the corresponding data 1304 agrees. As the check word will be significantly shorter than the data this means that processing is significantly faster. Furthermore in that case it is not in fact necessary to send the data as the processor itself will already have a copy of the data in the case of an exact match, by definition. Furthermore as the position in the data will determine what each value means and each processor is processing common data, there is no need to specify in the data what the values mean allowing further data compaction.

It will be appreciated that the invention can be implemented in any appropriate form such as hardware, software or firmware and, where appropriate, in any code such as the C programming language and in an engine, brake or steering control unit. Any specific processing and encoding approach can be applied to data blocks carrying the messages to be checked and validated. The skilled person will be aware of appropriate protocols for the communication of the data such that detailed discussion is not required here. The voting and synchronisation techniques described herein can be applied to any appropriate implementation. For example the voting process can be applied in any fault tolerant system such as a network of processors controlling operation of a vehicle or indeed any other application where redundancy and fault tolerance is required. Similarly although the time synchronisation approach is of particular benefit in relation to distributed network of processors, it can be applied in any appropriate implementation where time synchronisation is required as long as it supports a voting methodology.

The invention claimed is:

1. A method of calculating a time offset ($t_0$) between first and second processor nodes to be synchronised comprising the steps, performed at the first processor node, of:
   sending a first processor synchronisation signal at a first synchronisation instant ($t_1 s$);
   receiving a second processor synchronisation signal at a first receipt instant ($t_2 sr_1$), wherein said second processor synchronisation signal was sent by said second processor node at a second synchronisation instant ($t_2 s$) and wherein the offset ($t_0$) to be calculated comprises the difference between the first ($t_1 s$) and second ($t_2 s$) synchronisation instants;
   receiving the time of a second receipt instant ($t_1 sr_2$), at which the first processor synchronization signal arrived at the second processor node; and
   computing the time offset ($t_0$) as a function of the times of sending and receiving the signals.

2. The method as claimed in claim 1 in which the time offset is obtained from: $t_0 = ((t_1 sr_2 - t_1 s) - (t_2 sr_1 - t_2 s))/2$.

3. The method of claim 1, further comprising calculating a time offset at each of a plurality of nodes in a network, and determining the network time offset according to a vote between the calculated time offsets.

4. The method according to claim 1 further comprising:
receiving at the second node the time of the first receipt instant ($t_2sr_1$), at which the second processor synchronisation signal arrived at the first processor node;
computing at the second node a second node time offset ($t_0$) as a function of the times of sending and receiving the signals, wherein the second node time offset ($t_0$) to be calculated comprises the difference between the first ($t_1s$) and the second ($t_2s$) synchronisation instants; and
determining an agreed offset value from the time offset computed at the first node and the second node time offset.

5. The method of claim 1, further comprising determining a synchronised time value between multiple processor nodes in a network, said determining comprising comparing, at a first processor node, the time value generated by said first processor node at a synchronisation instant and a corresponding time value received from a second processor node in the network, wherein said corresponding time value is generated by the second processor node at the same synchronization instant, and determining the synchronised time value according to a comparison of the two generated time values.

6. The method of claim 5, further comprising synchronising processors in a network based on the determined synchronised time value and applying the synchronised time value at each processor.

7. The method as claimed in claim 5 in which the synchronised time value is determined according to a vote comprising a function of the compared values.

8. The method as claimed in claim 7 in which the synchronised time value comprises the median of the compared values.

9. The method of claim 1, further comprising identifying a valid version of a data value, in which each processor in a network generates an instance of the data value and transmits a version of the instance generated by another processor comprising the steps, performed at an identifying processor, of comparing a generated instance of a data value with a transmitted version of the same generated instance and identifying the instance as valid if the comparison is similar.

10. The method as claimed in claim 9 in which each data value includes a data message portion and a data check portion and in which the step of comparing instances of the data value comprises comparing the check portions.

11. The method as claimed in claim 9 in which the comparison is identical.

12. The method as claimed in claim 9 in which the comparison is similar if the compared data values are similar within a predetermined tolerance.

13. The method as claimed in claim 9 in which both the generated instance and the transmitted version are identified as valid if the comparison is similar.

14. The method as claimed in claim 9 in which the comparison and identification steps are performed for each instance generated at a processor.

15. The method of claim 9, further comprising determining an agreed version of a data value comprising the steps, performed at a determining processor, of comparing an instance of the data value generated at the determining processor with instances of the data value from other processors identified as valid, and establishing an agreed version based on the comparison.

16. The method as claimed in claim 15 further comprising, as an initial step, identifying if all instances are identical and if so establishing the instance as an agreed version.

17. The method as claimed in claim 15 in which the agreed version is a median value of the compared instances.

18. The method as claimed in claim 15 in which the comparison comprises a majority vote between instances.

19. The method of claim 15, further comprising controlling operation of a vehicle according to a control input influencing multiple sensor outputs comprising obtaining as data values at respective processors said sensor outputs and determining an agreed version of the data value.

20. The method as claimed in claim 19 in which the control input comprises one of a brake input, steering input or transmission change input.

* * * * *